United States Patent
Ahles et al.

(10) Patent No.: US 7,232,060 B2
(45) Date of Patent: Jun. 19, 2007

(54) POINT OF SALE DEVICES FOR CONVERTING PROMISSORY TRANSACTIONS INTO DEBIT TRANSACTIONS

(75) Inventors: Daniel Ahles, Houston, TX (US); Lara Carsley Redmon, Cypress, TX (US)

(73) Assignee: First Data Corporation, Englewood, CO (US)

( * ) Notice: Subject to any disclaimer, the term of this patent is extended or adjusted under 35 U.S.C. 154(b) by 0 days.

(21) Appl. No.: 11/017,956

(22) Filed: Dec. 21, 2004

(65) Prior Publication Data

US 2006/0131384 A1 Jun. 22, 2006

(51) Int. Cl.
- G06Q 40/00 (2006.01)
- G07D 11/00 (2006.01)
- G07F 19/00 (2006.01)

(52) U.S. Cl. .................. 235/379; 235/375; 705/35; 705/45

(58) Field of Classification Search .............. 235/379, 235/375, 381; 705/17, 38, 39, 45
See application file for complete search history.

(56) References Cited

U.S. PATENT DOCUMENTS

| | | |
|---|---|---|
| 5,175,682 A | 12/1992 | Higashiyama et al. |
| 5,237,159 A | 8/1993 | Stephens et al. |
| 5,444,616 A | 8/1995 | Nair et al. |
| 5,679,938 A | 10/1997 | Templeton et al. |
| 5,679,940 A | 10/1997 | Templeton et al. |
| 5,691,524 A | 11/1997 | Josephson |
| 5,703,344 A | 12/1997 | Bezy et al. |
| 5,801,366 A | 9/1998 | Funk et al. |
| 5,848,400 A | 12/1998 | Chang |
| 5,848,412 A | 12/1998 | Rowland et al. |
| 5,930,777 A | 7/1999 | Barber |
| 5,991,758 A | 11/1999 | Ellard |
| 6,059,185 A | 5/2000 | Funk et al. |
| 6,097,834 A | 8/2000 | Krouse et al. |
| 6,117,011 A | 9/2000 | Lvov |
| 6,189,785 B1 | 2/2001 | Lowery |
| 6,647,376 B1 * | 11/2003 | Farrar et al. .................. 705/45 |
| 6,728,397 B2 * | 4/2004 | McNeal ...................... 382/137 |
| 7,062,463 B2 * | 6/2006 | Knapp .......................... 705/39 |
| 7,124,936 B2 * | 10/2006 | Templeton et al. ......... 235/380 |
| 2002/0178112 A1 | 11/2002 | Goeller et al. |
| 2003/0130919 A1 * | 7/2003 | Templeton et al. ........... 705/35 |
| 2003/0187796 A1 * | 10/2003 | Swift et al. ................... 705/45 |
| 2003/0222135 A1 * | 12/2003 | Stoutenburg et al. ....... 235/379 |
| 2004/0181485 A1 * | 9/2004 | Finch et al. .................. 705/45 |
| 2005/0097050 A1 * | 5/2005 | Orcutt .......................... 705/45 |

* cited by examiner

Primary Examiner—Thien M. Le
Assistant Examiner—Edwyn Labaze
(74) Attorney, Agent, or Firm—Knobbe Martens Olson & Bear

(57) ABSTRACT

Systems and methods are provided for using a point of sale device to obtain authorization from a customer to convert the customer's promissory transaction to a direct debit transaction. In an embodiment, the point-of-sale device prints an authorization form for the customer's signature.

33 Claims, 8 Drawing Sheets

FIG. 8

Date September 16, 2004      Time 12:57:15
Mer # 12345678      Term # 555

Merchant Name
Merchant Address
City, State, Zip Code
Merchant Phone #

*I authorize this transaction to be settled through the debit network and the debiting of my account for payment of the sale amount.*

Electronic Check

| | |
|---|---|
| TOTAL SALE AMOUNT | $25.00 |
| TRANSACTION # | 001 |
| BATCH # | 002 |
| TRACE NUMBER | 123456789123456789 |
| CHECK NUMBER | 1234 |
| Approval Code | 1234 |
| Account # | ***********1234 |
| Terminal ID | 123456789123456789 |

Processed as a Debit Transaction

X_____
Check Writer's Signature

ELECTRONICALLY DEPOSITED
IT'S SAFE. IT'S SECURE.

MERCHANT COPY

POINT OF SALE DEVICES FOR CONVERTING PROMISSORY TRANSACTIONS INTO DEBIT TRANSACTIONS

BACKGROUND OF THE INVENTION

1. Field of the Invention

This invention relates generally to debit transactions, and more particularly to systems and methods for determining when to convert a promissory transaction into a debit transaction.

2. Description of the Related Art

Most financial transactions involve a customer making a payment to a merchant in exchange for goods or services. Many times the payment is in a promissory form, such as a check that instructs the customer's bank to pay the merchant from a demand deposit account (DDA). A DDA is an account, such as a checking account, whose balance can be drawn upon on demand without prior notice. As is well known, the funds promised by the check are sometimes not paid, due to reasons such as insufficient funds in the customer's checking account or fraud. Examples of fraud include, but are not limited to, payments made with checks or debit cards that are stolen, counterfeit, or written for accounts that no longer exist. Thus, although it may be considered good business practice for a merchant to accept promissory DDA payments, the merchant is taking a risk whenever a check or other promissory DDA payment is accepted in exchange for goods or services.

In order to manage these and other financial transaction risks, some merchants subscribe to a service that assesses risks associated with financial transactions. For a given check transaction, a subscribed merchant can send a point-of-sale transaction approval request to the service with information, such as check amount, account identification, and check-writer identification. The service assesses the risk and either authorizes or declines the transaction based on the risk assessment.

Sometimes, however, the risk assessment may indicate declining the check and good sales may be lost. As an example, a financially responsible check-writer may move to a new area and establish a new checking account. When a check drawn from the new account is processed by the check approval service, a lack of previous historical data for that checking account in the service's databases may lead to the merchant declining the check, and a potentially good sale is lost. A more far-reaching consequence of over-declining borderline risk transactions is the possibility of stimulating negative sentiment towards the merchant on the part of potential purchasers, which in turn stimulates negative sentiment towards the check acceptance service on the part of the merchant.

SUMMARY OF THE INVENTION

Systems and methods are provided for using a point of sale device to determine when to convert promissory transactions into direct debit transactions. In an embodiment, systems and methods are provided for using a point-of-sale device to obtain authorization from a customer to convert the customer's promissory transaction to a direct debit transaction. In an embodiment, the point-of-sale device prints an authorization form for the customer's signature.

Promissory transactions may be any financial transaction that contains or conveys a promise or assurance to pay for goods or services such as, by way of example, check transactions, credit transactions, debit transactions, and transactions with a negotiable instrument. Examples of negotiable instruments are checks, bills of exchange, promissory notes, credit cards, debit cards, bonds, share certificates, account cards, traveler's checks, and electronic transfers. A check as used herein means a draft, payable on demand and drawn on a bank. A set of rules evaluates the risk associated with a promissory or check transaction. When the promissory or check transaction has a predetermined level of risk, a debit determination system, using the point-of-sale device, evaluates the transaction to determine when to convert the promissory or check transaction into the debit transaction.

Other forms of payment, such as cash and debit cards have less financial risk as the financial transaction for the goods and services is completed at the point of sale. In the case of the debit card, the customer's bank account is typically directly debited at the point of sale.

In an effort to keep sales, engender positive customer relations toward the merchant, and reduce the financial risk to the check acceptance service, the check acceptance service may convert the checking transaction to a direct debit transaction. The amount of the check is debited from the customer's checking account at the point of sale. The customer receives the goods or services, the merchant completes a sale and maintains customer goodwill, and the check acceptance service reduces its costs.

Information useful in determining when to convert a check transaction to a direct debit transaction includes DDA information. However, various types of costs are involved in a DDA access. For example, processing a DDA information access request typically requires a certain amount of time. If an ACCEPT/DECLINE decision is being made while a customer waits at a point-of-sale checkout stand, minimizing wait times may be desirable. Another cost involved in accessing DDA information may be a fee charged by the bank, financial institution, or other provider of the DDA information.

Thus, access to DDA information for every transaction may not be beneficial from the point of view of a cost/benefit analysis. The ability to determine when to convert a check transaction to a direct debit transaction is therefore valuable input to a financial transaction decision.

In an embodiment, a point of sale device for converting check transactions into direct debit transactions comprises a magnetic ink character recognition (MICR) reader for reading MICR characters from a check transaction, a keypad for entering an amount of the check transaction, and an interface for transmitting the MICR characters, the amount, and a check authorization transaction request associated with the check transaction to a check acceptance service. The point of sale device further comprises a display for displaying a decision from the check acceptance service to convert the check transaction to a direct debit transaction, and a printer for printing an authorization form for obtaining a check writer's authorization authorizing a conversion of the check transaction into the direct debit transaction.

In another embodiment, a point of sale device for converting promissory transactions into direct debit transactions comprises an interface for transmitting data associated with a promissory transaction to a check acceptance service, and a display for displaying a decision from the check acceptance service to convert the promissory transaction to a direct debit transaction.

In a further embodiment, a point of sale device for converting promissory transactions into direct debit transactions comprises a printer for printing an authorization form for obtaining a check writer's authorization authorizing a conversion of a promissory transaction into a direct debit transaction after a check acceptance service determines a level of risk associated with the promissory transaction is unacceptable.

In a yet further embodiment, a method of using a point of sale device to convert a promissory transaction into a direct debit transaction comprises transmitting with a point of sale device data about a promissory transaction to a check acceptance service and displaying with the point of sale device a decision from the check acceptance service to convert the promissory transaction to a direct debit transaction.

In an embodiment, a point of sale device for converting a promissory transaction into a direct debit transaction comprises a means for obtaining at least one transaction detail associated with a promissory transaction, a means for sending the at least one transaction detail, and a promissory transaction request associated with the promissory transaction to a check acceptance service, and a means for receiving a decision from a check acceptance service to convert the promissory transaction into a direct debit transaction.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements. In addition, the first digit of each reference number indicates the figure in which the element first appears.

FIG. 8 is an exemplary customer authorization form for obtaining customer authorization to convert a checking transaction to a direct debit transaction.

DETAILED DESCRIPTION OF THE PREFERRED EMBODIMENT

Figure 1:
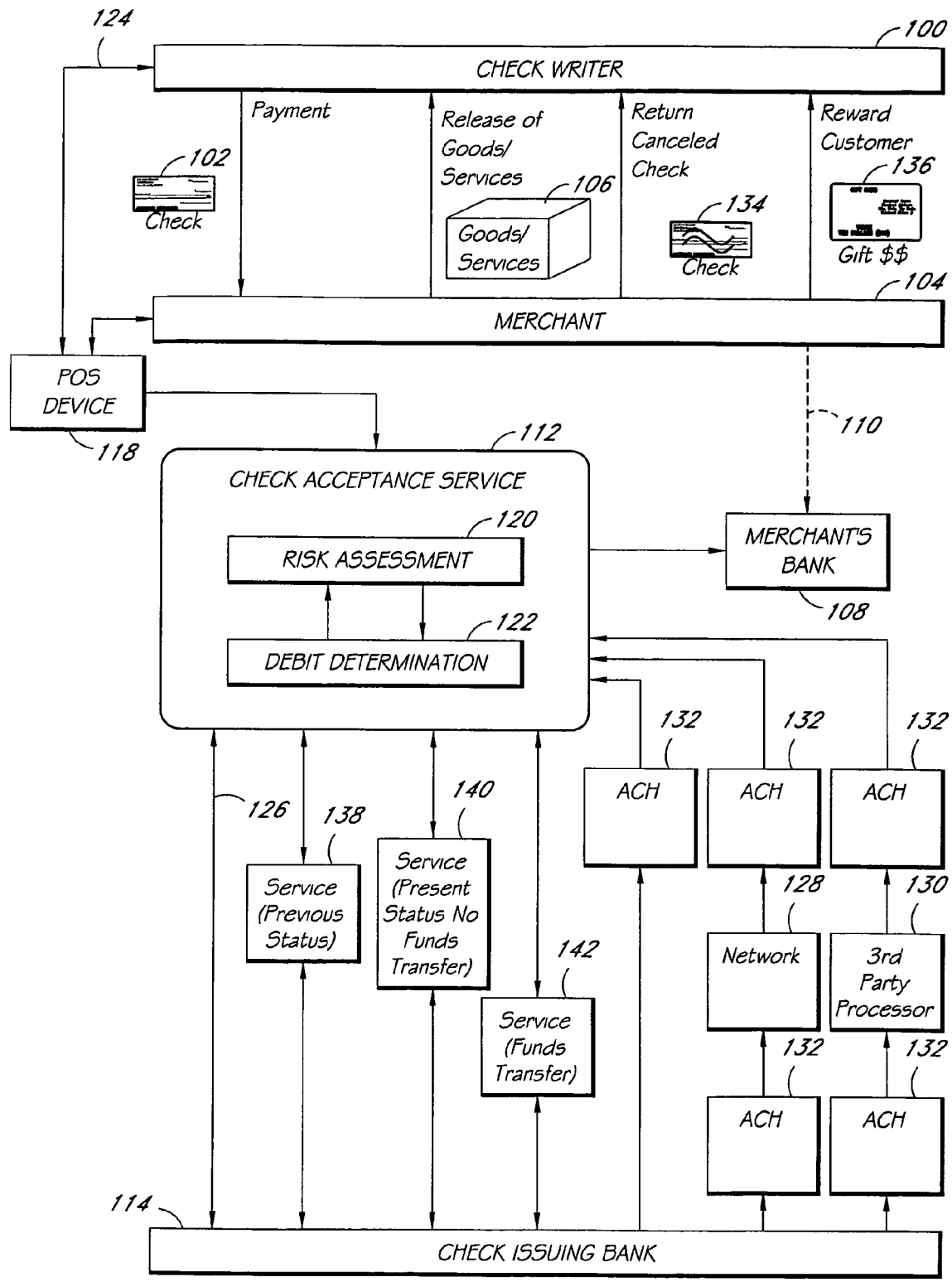
FIG. 1 illustrates an embodiment of a financial transaction process, including a debit determination by a check acceptance service, in which a check is converted to a direct debit.

For a more detailed understanding of the invention, reference is first made to FIG. 1. FIG. 1 illustrates an embodiment of a financial transaction process, including a debit determination by a check acceptance service, in which a check is converted to a direct debit. A check writer 100 writes a check 102 to a merchant 104 in exchange for service/merchandise/cash 106. The check may be accepted and deposited into a merchant's bank 108 without receiving any external authorization as indicated by path 110. The check 102 then goes through a clearing process that is well known.

In some transactions, the check 102 does not clear for various reasons, such as, but not limited to insufficient funds, a stop payment request by the check writer 100, a fraudulent check, etc. Consequently, the merchant's bank account is not credited with the check amount in these instances. When the check 102 does not clear, the merchant 104 is often left with the responsibility of collecting the check amount from the check writer 100.

As a consequence, many merchants 104 subscribe to and rely on a check acceptance service 112 to manage risks associated with accepting checks from customers. In certain embodiments, the check acceptance service 112 guarantees or buys the check 102 based on the risk associated with the transaction. The transaction is complete as far as the merchant 104 is concerned when the merchant 104 accepts the check 102 upon approval from the check acceptance service 112. In this example, the check acceptance service 112 assumes the responsibility of having the check 102 cleared.

If the check 102 is valid, the funds are transferred from a check-issuing bank 114 to the check acceptance service 112. The check 102 goes through a clearing process that is well known. If the check 102 is not valid, the check acceptance service 112 may assume the responsibility of collecting from the check writer 100.

The profitability of the check acceptance service 112 depends, at least in part, on accurately assessing the risks of check acceptance and reducing the cost of collecting on bad checks.

An embodiment of the invention comprises a selective debit determination process, in which the check acceptance service 112 determines when to convert a check transaction into a direct debit transaction.

Referring to FIG. 1, after the merchant 104 receives the check 102, the merchant 104 transmits transaction details to the check acceptance service 112 via a point-of-service device 118. Transaction details include, but are not limited to the demand deposit account (DDA) number, the check writer's driver's license number, the check amount, the check number, and the merchant number.

In an embodiment, the check acceptance service 112 performs a risk assessment 120 to assess the risk associated with the check transaction. If the risk is below a predetermined risk threshold, the check acceptance service 112 sends an ACCEPT decision to the merchant 104. The merchant 104 accepts the check 102 and the check 102 is processed.

If the risk assessment 120 determines that the risk is too high for a variety of reasons, the check acceptance service 112 sends a DECLINE decision to the merchant 106. The merchant 104 declines the check 102 and the transaction is not completed. High risk scores may be caused by a history of writing bad checks, or a fraudulent check, such as a check written on a non-existent account or a check written on a closed account, for example.

If the risk is above, and close to the predetermined risk threshold, or in a grey area, the check acceptance service 112 performs a debit determination 122. In an embodiment, the debit determination 122 invokes a set of rules. In another embodiment, the debit determination 122 invokes a scoring model. The outcome of the debit determination rules or the score from the debit determination scoring model determine which method to use to acquire the check writer's demand deposit account (DDA) information.

The outcome of the debit determination rules or the score from the debit determination scoring model, in an embodiment, direct the check acceptance service 112 to acquire the DDA information associated with the check writer. The merchant 104 provides the check acceptance service 112 with check writer information such as, for example, name, address, or phone number. Then, in an embodiment, the check acceptance service 112 contacts the check writer's bank to verify that the funds are in the account. In another embodiment, the check acceptance service 112 calls the check writer's phone number to verify the phone number is a valid phone number.

In an embodiment, the request for DDA information and the DDA information are transferred directly between the check issuing bank 114 and the check acceptance service 112 as indicated by a path 126.

The outcome of the debit determination rules or the score from the debit determination scoring model, in another embodiment, direct the check acceptance service 112 to acquire the DDA information by contacting a service 138 that provides the previous day's status of the check writer's account. In an embodiment, the service 138 is an off-line service.

In an embodiment, the request for DDA information and the DDA information are transferred between the check issuing bank 114 and the check acceptance service 112 via the service 138.

The outcome of the debit determination rules or the score from the debit determination scoring model, in another embodiment, direct the check acceptance service 112 to acquire the DDA information by contacting a service 140 that provides the present status of the check writer's account, but does not move funds. In an embodiment, the service 140 is an on-line service.

In an embodiment, the request for DDA information and the DDA information are transferred between the check issuing bank 114 and the check acceptance service 112 via the service 140.

If the funds are in the check writer's account, or if the check writer's phone number is a valid phone number, the check acceptance service may approve the risk of accepting the check writer's check 102. The check acceptance service 112 transmits the ACCEPT decision to the merchant 104 at the point of sale. The merchant 104 accepts the check 102, and the check acceptance service 112 initiates the check processing process.

If the funds are not in the account, or if the phone number is not a valid phone number, the check acceptance service 112 may not approve the risk of accepting the check 102. When the check acceptance service 112 does not approve the risk of the transaction, the check acceptance service 112 transmits the DECLINE decision to the merchant 104. The merchant 104 does not accept the check 102 and the transaction is terminated.

However, in order not to decline a potentially good sale, the check acceptance service 112 may convert the check transaction into the direct debit transaction.

The outcome of the debit determination rules or the score from the debit determination scoring model, in another embodiment, direct the check acceptance service 112 to acquire the DDA information by contacting a service 142 that initiates the direct debit from the check writer's account for the amount of the transaction. In the direct debit transaction, the check writer's account is then debited by the amount of the check 102 at the time of the transaction. In an embodiment, the service 142 is an on-line service.

When the check acceptance service 112 determines that it is beneficial to convert the check 102 to the direct debit, the check acceptance service 112 obtains the check writer's authorization via the point-of-sale device 118 as indicated by a path 124 and described in further detail below. In an embodiment, the point-of-sale device 118 prints a customer authorization for the check writer 100 to sign authorizing the direct debit transaction.

The direct debit transaction, in an embodiment, may be settled by processing the direct debit from the check issuing bank 114 through the Automated Clearing House (ACH) 132 to the check acceptance service 112.

In another embodiment, the direct debit transaction may be settled by processing the direct debit from the check issuing bank 114 through the ACH 132 via the network 128 to the check acceptance service 112.

In another embodiment, the direct debit transaction may be settled by processing the direct debit from the check issuing bank 114 through the ACH 132 via the third party processor 130 to the check acceptance service 112.

The merchant 104 cancels the check 102, creating a canceled check 134. The merchant 104 returns the canceled check 134 to the check writer 100 and the transaction is completed.

In another embodiment, the check acceptance service 112 uses the transaction data, such as, for example, the check amount, to determine whether to perform the risk assessment 120 or the debit determination 122.

For example, when the check amount is above a predetermined check amount threshold, the check acceptance service 112 performs the debit determination 122 prior to performing the risk assessment 120. If the debit determination 122 determines that the check 102 should not be converted to the direct debit, or if the direct debit process fails because there are not sufficient funds to cover the check 102, for example, the check acceptance service 112 then performs the risk assessment 120. The risk assessment 120 may indicate that the check 102 should be accepted by the merchant 104.

In another example, the check amount is below the predetermined check amount threshold. The check acceptance service 112 performs the risk assessment 120 prior to performing the debit determination 122. If the risk assessment 120 determines that the risk is too high to accept the check 102, the check acceptance service 112 then performs the debit determination 122. In an embodiment, the debit determination 122 indicates that the check 102 be converted to the debit transaction, which is then successful due to sufficient funds in the check writer's account to cover the check 102 as explained in further detail below. In another embodiment, the debit determination 122 may indicate assessing the risk of the transaction with the DDA information acquired through the debit determination process 122.

Figure 2:
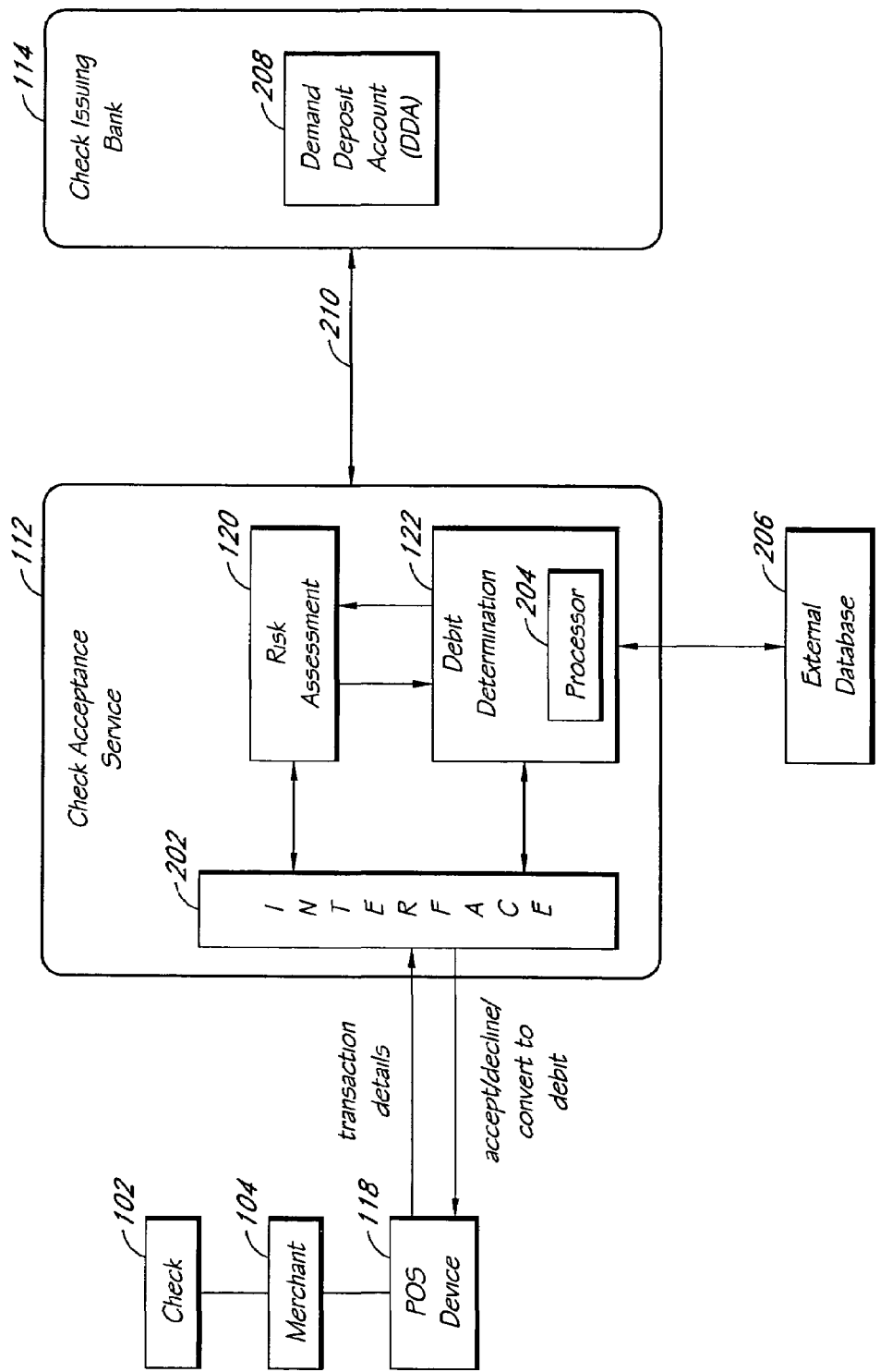
FIG. 2 illustrates an embodiment of a functional a block diagram of the check acceptance service comprising a debit determination system.

FIG. 2 illustrates an embodiment of a functional block diagram of the check acceptance service 112 comprising the debit determination system 122. The check acceptance service 112 further comprises the risk assessment system 120 and an interface 202.

The debit determination system 122 further comprises a computer 204. The computer 204 comprises, by way of example, processors, program logic, or other substrate configurations representing data and instructions, which operate as described herein. In other embodiments, the processors can comprise controller circuitry, processor circuitry, processors, general-purpose single-chip or multi-chip microprocessors, digital signal processors, embedded microprocessors, microcontrollers, and the like.

In one embodiment, the program logic may advantageously be implemented as one or more modules. The modules may advantageously be configured to execute on one or more processors. The modules may comprise, but are not limited to, any of the following: software or hardware components such as software object-oriented software components, class components and task components, processes methods, functions, attributes, procedures, subroutines, segments of program code, drivers, firmware, microcode, circuitry, data, databases, data structures, tables, arrays, or variables.

The debit determination system 122 transmits data to and receives data from the risk assessment system 120 and the interface 202. The risk assessment system 120 also transmits data to and receives data from the interface 202. The interface 202 interfaces the check acceptance service 112 to the merchant 104 via the point-of-sale-device 118.

The debit determination system 122 interfaces with an external data base 206. In an embodiment, the external database 206 is the check writer's bank 114, which provides DDA information. In another embodiment, the external database 206 is the service 138, which provides the previous day's DDA information. In another embodiment, the external database 206 is the service 140, which provides current DDA information, but does not transfer funds.

In another embodiment, the check acceptance service 112 requests DDA information from the service 142 and the service 142 initiates a direct debit transaction from the check writer's demand deposit account (DDA) 208 in the check writer's bank 114 as indicated by a path 210.

In an embodiment, the path 210 represents a path from the check acceptance service 112 to the check writer's bank 114 through the ACH. In another embodiment, the path 210 represents a path between the check acceptance service 112 and the check writer's bank 114 through the ACH via the network 128 or via the third party processor 130.

In a further embodiment, the path 210 represents a direct link from the check acceptance service 112 to the check writer's bank 114. In a further embodiment, the path 210 represents a path between the check acceptance service 112 and the check writer's bank 114 via the network 128 or via the third party processor 130.

Figure 3:
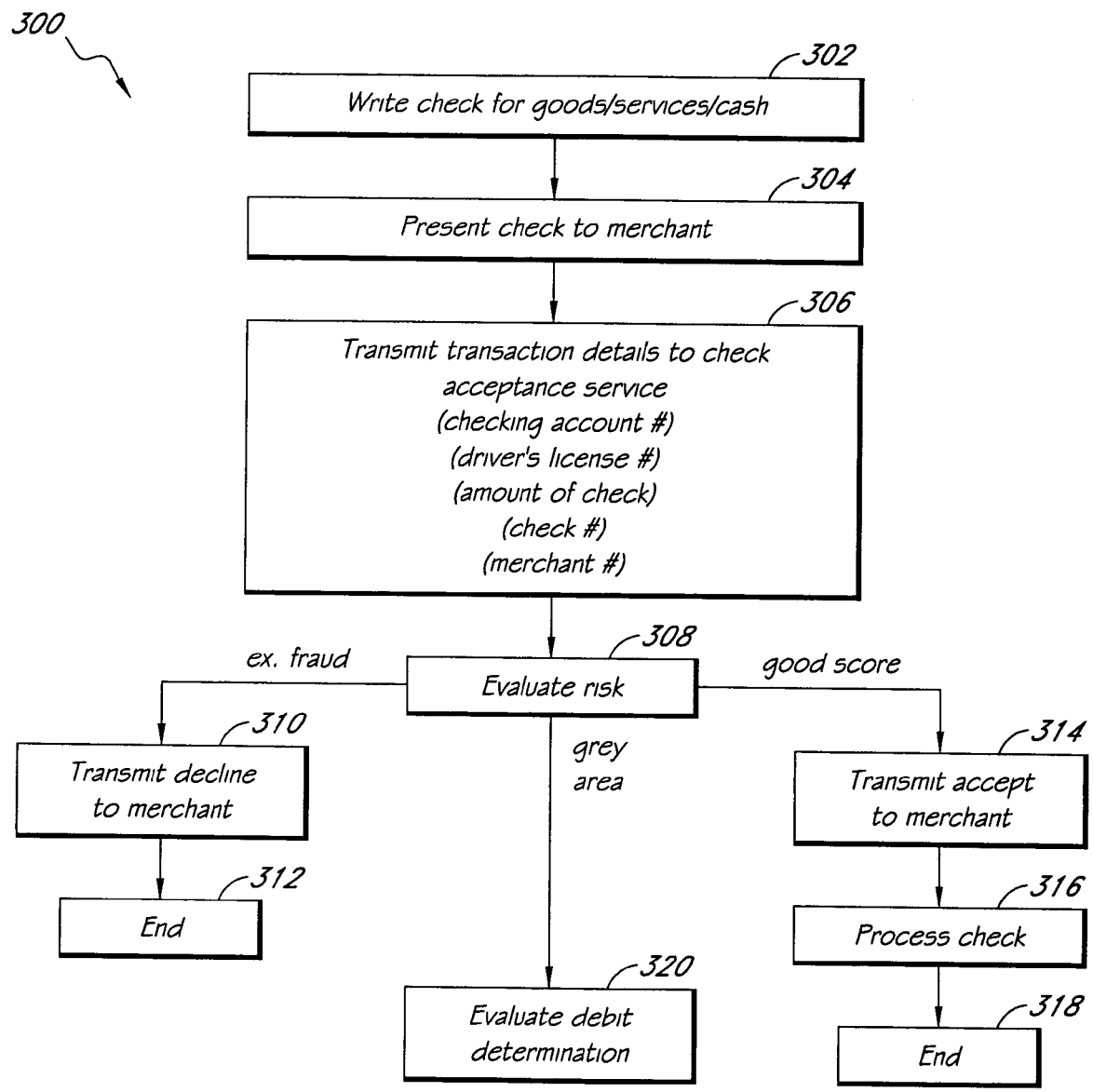
FIG. 3 illustrates a flow chart of an embodiment of a financial transaction process to determine when to convert a check to a direct debit.

FIG. 3 illustrates a flow chart 300 of an embodiment of a financial transaction process to determine when to convert the check 102 to the direct debit. The check writer 100 writes the check 102 for goods/services/cash in a block 302. The check writer 100 presents the merchant 104 with the check 102 in a block 304. The merchant 104 enters the transaction details into the point-of-sale device 118. The point-of-sale device 118 transmits the transaction details to the risk assessment system 120 and the debit determination system 122 via the interface 202 in a block 306. The transaction details may include, but are not limited to the check writer's checking account number, the check writer's driver's license number, the amount of the check, the check number, and the merchant number.

In a block 308, the risk assessment system 120 evaluates the risk associated with the transaction. When the level of risk is above the predetermined risk threshold, the risk assessment system 120 transmits the ACCEPT decision to the merchant 104 via the point-of-sale device 118 in a block 314. This indicates that the risk associated with the transaction is an acceptable level of risk to the check acceptance service 112. The merchant 104 accepts the check 102 and the check 102 is processed in a block 316. The transaction is completed and the process ends at a block 318.

When the risk assessment system 120, in the block 308, determines that the level of risk is below and near the predetermined risk threshold, or in the grey area, the check acceptance service 112 evaluates the debit determination 122 in a block 320. The debit determination system 122 evaluates which method to use to acquire DDA information. The check acceptance service 112 uses the DDA information to perform an additional risk analysis of the transaction, or to directly debit the check writer's account 208 for the amount of the transaction at the point of sale. The debit determination 122 of the block 320 is described in further detail in FIG. 4 below.

When the level of risk is below the predetermined risk threshold and not near the threshold, the risk assessment system 120 transmits the DECLINE decision to the merchant 104 via the point-of-sale device 118 in a block 310. This indicates that the risk associated with the transaction is not an acceptable level of risk to the check acceptance service 112. The transaction is not completed and the process ends at a block 312.

Figure 4:
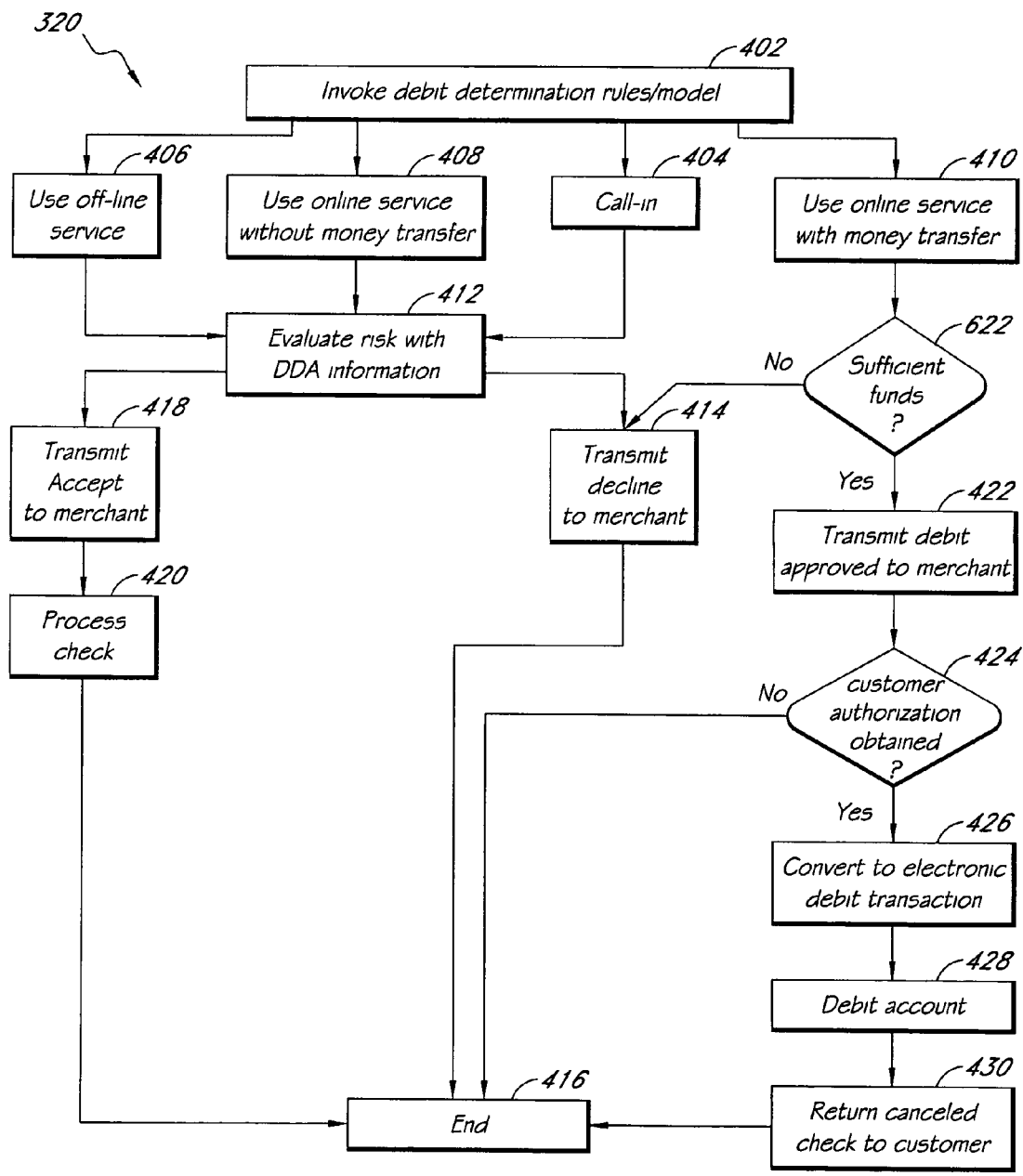
FIG. 4 illustrates a flow chart of an embodiment of a debit determination process performed by the check acceptance service.

FIG. 4 is a flow chart depicting a more detailed view of an embodiment of evaluating the debit determination 122 in the block 320 of FIG. 3.

In an embodiment, the debit determination system 122 invokes a set of debit determination rules in a block 402. In another embodiment, the debit determination system 122 invokes a debit determination scoring model in the block 402.

Based on the outcome of the debit determination rules or the score from the debit determination scoring model, the check acceptance service 112 chooses which method to use to acquire the check writer's DDA information. In a first method, in a block 404, the check acceptance service 112 acquires the check writer's DDA information by contacting the merchant 104 and the check writer's bank 114. The check writer's bank 114 provides the check acceptance service 112 with the present status of the check writer's account 208.

In a second method, in a block 406, the check acceptance service 112 acquires the check writer's DDA information by engaging the service 138. The service 138 provides the previous day's status of the check writer's account 208 to the check acceptance service 112.

In a third method, in a block 408, the check acceptance service 112 acquires the check writer's DDA information by engaging the service 140 that does not perform fund transfers. The service 140 provides the present status of the check writer's account 208 to the check acceptance service 112, but does not initiate a funds transfer. The status may include, but is not limited to determining if the account contains sufficient funds to cover the transaction.

In a block 412, the debit determination system 122 evaluates the risk of accepting the check 102 using the DDA information. If the risk is not an acceptable level of risk to the check acceptance service 112, the check acceptance service 112 transmits the DECLINE decision to the merchant 104 via the point-of-sale device 118 in a block 414. The transaction is not completed and the process ends at a block 416.

If the risk is an acceptable level of risk to the check acceptance service 112, the check acceptance service 112 transmits the ACCEPT decision to the merchant 104 via the point of service device 118 in a block 418. The merchant 104 accepts the check 102 and the check 102 is processed in a block 420. The transaction is completed and the process ends at the block 416.

However, there is still a risk that the funds will not be in the account when the check 102, if accepted, clears the bank 114. If the funds are not in the account when the check 102 clears the bank 114, the check acceptance service 112 has the additional expense of collecting on the bad debt.

The outcome of the debit determination rules or the score from the debit determination scoring model from the block 402 may indicate that knowing the status of the check writer's account 208 does not decrease the risk of accepting the check 102 to a level acceptable to the check acceptance service 112. However, in order not to decline a potentially good sale, the check acceptance service 112 performs a fourth method of acquiring the check writer's DDA information.

In the fourth method, in a block 410, the check acceptance service 112 acquires the check writer's DDA information by engaging the service 142 to initiate the direct debit of the check writer's account 208 for the amount of the transaction.

When insufficient funds exist in the check writer's account 208, in a block 421, the check acceptance service 112 transmits the DECLINE decision to the merchant 104 in a block 414. The transaction is not completed and the process ends in the block 416.

When sufficient funds exist in the check writer's account 208 in the block 421, the check acceptance service 112 transmits a DEBIT APPROVED decision to the merchant 104 via the point-of-sale device 118 in a block 422.

In a block 424, in an embodiment, the point-of-sale device 118 prints a customer authorization for the check writer 100 to sign. The signed authorization authorizes the direct debit from the check writer's account 208 at the point of sale. The merchant 104 verifies the check writer 100 has authorized the direct debit and transmits the verification to the check acceptance service 112 via the point-of-sale device 118.

If the check writer 100 does not sign the authorization form, the transaction is not completed and the process ends at the block 416.

In a block 426, in an embodiment, the checking transaction is converted to the direct debit transaction. In another embodiment, in the block 426, the checking transaction is converted to an electronic direct debit transaction. In a block 428, the check writer's bank 114 debits the check writer's account 208 for the amount of the check 102. In a block 430, the merchant cancels the check 102. In another embodiment, the merchant cancels the check 102 at the point-of-sale device 118. The merchant 104 returns the canceled check 134 to the check writer 100. The transaction is completed and the process ends at the block 416. The check acceptance service 112 does not have the additional expense of collecting on a bad debt because the funds are debited from the check writer's account 208 at the time of the transaction.

Figure 5:
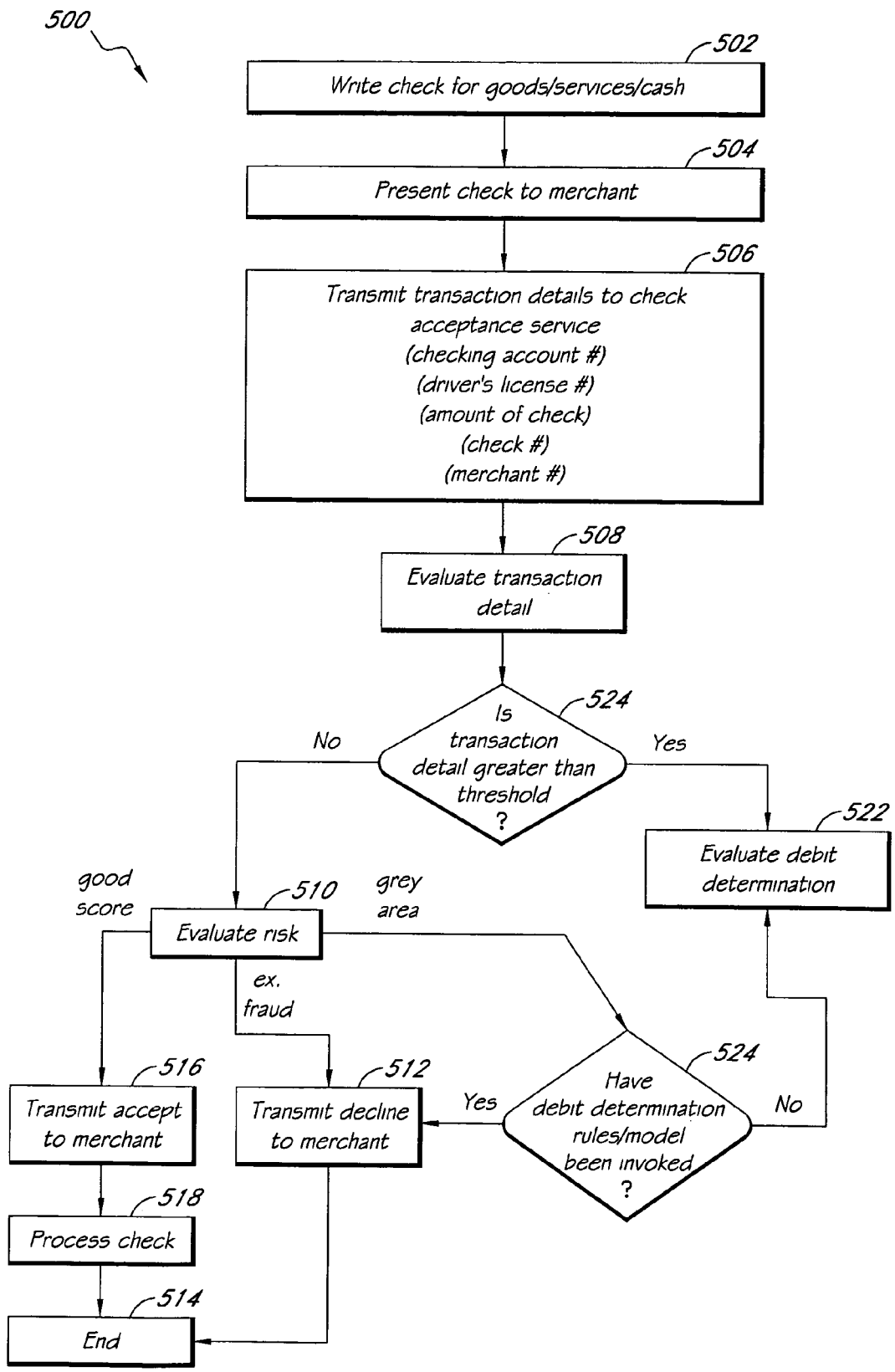
FIG. 5 illustrates a flow chart of another embodiment of a financial transaction process to determine when to convert a check to a direct debit.

FIG. 5 illustrates a flow chart 500 of another embodiment of a financial transaction process to determine when to convert the check 102 to the direct debit transaction. In this embodiment, the result of the risk assessment system 120 may override the result of the debit determination system 122. Further, the result of the debit determination system 122 may override the result of the risk assessment system 120.

The check writer 100 writes the check 102 for goods/services/cash in a block 502. The check writer 100 presents the merchant 104 with the check 102 in a block 504. The merchant 104 enters the transaction details into the point-of-sale device 118. The point-of-sale device 118 transmits the transaction details to the risk assessment system 120 and the debit determination system 122 via the interface 202 in a block 506.

The check acceptance service 112 evaluates the transaction details in a block 508 using a set of transaction detail rules or a transaction detail scoring model. The check acceptance service determines whether to evaluate the risk 120 before evaluating the debit determination 122, or whether to evaluate the debit determination 122 before evaluating the risk 120 for the transaction.

For example, if the amount of the check 102 is greater than a predetermined check amount threshold, the check acceptance service 112 may evaluate the debit determination 122 prior to evaluating the risk 120. The debit determination 122 determines which method the check acceptance service 112 uses to obtain DDA information. The high value of the check may warrant the additional cost of obtaining DDA information, and thus, reduce the risk of the transaction.

Obtaining the DDA information results in initiating the direct debit, invoking the set of rules to evaluate the risk with the DDA information, or invoking the scoring model that scores the DDA information. When the direct debit results in an incomplete transaction or the risk analysis with the DDA information does not result in an acceptable level of risk, the check acceptance service 112 may then evaluate the risk using the set of rules or the scoring model that does not use DDA information.

For example, the check writer's history may show a pattern of writing checks just prior to payday. The account may not have sufficient funds when the check writer 100 writes the check 102, but when the check 102 clears the bank 114, the account has sufficient funds. Even though evaluating the debit determination 122 results in an unacceptable level of risk to the check acceptance service 112, evaluating the risk 120 using the check writer's history results in an acceptable level of risk to the check acceptance service 112. The merchant 104 accepts the check 102 and the transaction is completed.

In another example, when the amount of the check is less than the predetermined check amount threshold, the check acceptance service 112 may evaluate the risk 120 of the transaction prior to evaluating the debit determination 122. The lower value of the check 102 may reduce the risk of the transaction and not warrant the additional cost of obtaining DDA information initially.

When the risk analysis 120 using the set of rules or the scoring model that does not use DDA information results in an unacceptable level of risk to the check acceptance service 112, the check acceptance service 112 may then acquire DDA information using the debit determination 122 rather than sending the DECLINE decision. The check acceptance service 112 can either re-evaluate the risk of the transaction using the set of rules or the scoring model that scores the DDA information, or engage the service 142 to initiate the direct debit transaction.

Evaluating the risk using the set of rules or the scoring model that uses DDA information may result in an acceptable level of risk to the check acceptance service 112. The merchant accepts the check 102 and the transaction is completed. Further, a successful direct debit transaction also results in a completed transaction In another example, transactions from a certain type of merchant, such as, for example, a pawn shop, may warrant the additional cost of obtaining DDA information before evaluating the risk, and thus reducing the risk of the transaction.

In a block 524, the check acceptance service 112 compares the result of applying the transaction detail rules or the score from the transaction detail scoring model with a predetermined transaction detail threshold. When the result or score is below the predetermined transaction detail threshold, the check acceptance service 112 evaluates the risk of the transaction in a block 510. In another embodiment, when the result or score is above the predetermined transaction detail threshold, the check acceptance service 112 evaluates the risk of the transaction in the block 510.

In the block 510, the risk assessment system 120 evaluates the risk associated with the transaction. When the level of risk is above the risk threshold, indicating that the risk associated with the transaction is acceptable to the check acceptance service 112, the risk assessment system 120 transmits the ACCEPT decision to the merchant 104 via the point-of-sale device 118 in a block 516. The merchant 104 accepts the check 102 and the check 102 is processed in a block 518. The transaction is completed and the process ends at the block 514.

When the risk assessment system 120, in the block 510, determines that the level of risk is below and near the risk threshold, or in the grey area, the check acceptance service 112 determines if the debit determination rules or debit determination scoring model (block 522) have been invoked in a block 520.

If the check acceptance service 112 previously invoked the debit determination rules or the debit determination scoring model for this transaction, the check acceptance service 112 transmits the DECLINE decision to the merchant in the block 512. This indicates that evaluating the debit determination (block 522) and evaluating the risk of the transaction without the DDA information (block 510) resulted in an unacceptable level of risk to the check acceptance service 112. Evaluating the debit determination (block 522) may have resulted in a failed direct debit transaction or an unacceptable level of risk from evaluating the risk of the transaction with the DDA information. The transaction is not completed and the process ends at the block 514.

When the check acceptance service 112 has not previously invoked the debit determination rules or the debit determination scoring model for this transaction, the check acceptance service 112 evaluates the debit determination 122 in a block 522. The debit determination 122 in the block 522 is described in further detail in FIG. 6 below.

Referring to the block 510, when the risk is below the risk threshold and not near the risk threshold, indicating that the risk associated with the transaction is not acceptable to the check acceptance service 112, the risk assessment system 120 transmits the DECLINE decision to the merchant 104 via the point-of-sale device 118 in a block 512. The transaction is not completed and the process ends at a block 514.

Referring to the block 524, the check acceptance service 112 compares the result of applying the transaction detail rules or the score from the transaction detail scoring model with the predetermined transaction detail threshold. When the result or score is above the predetermined transaction detail threshold, the check acceptance service 112 evaluates the debit determination 122 in the block 522. In another embodiment, when the result or score is below the predetermined transaction detail threshold, the check acceptance service 112 evaluates the debit determination 122 in the block 522.

Figure 6:
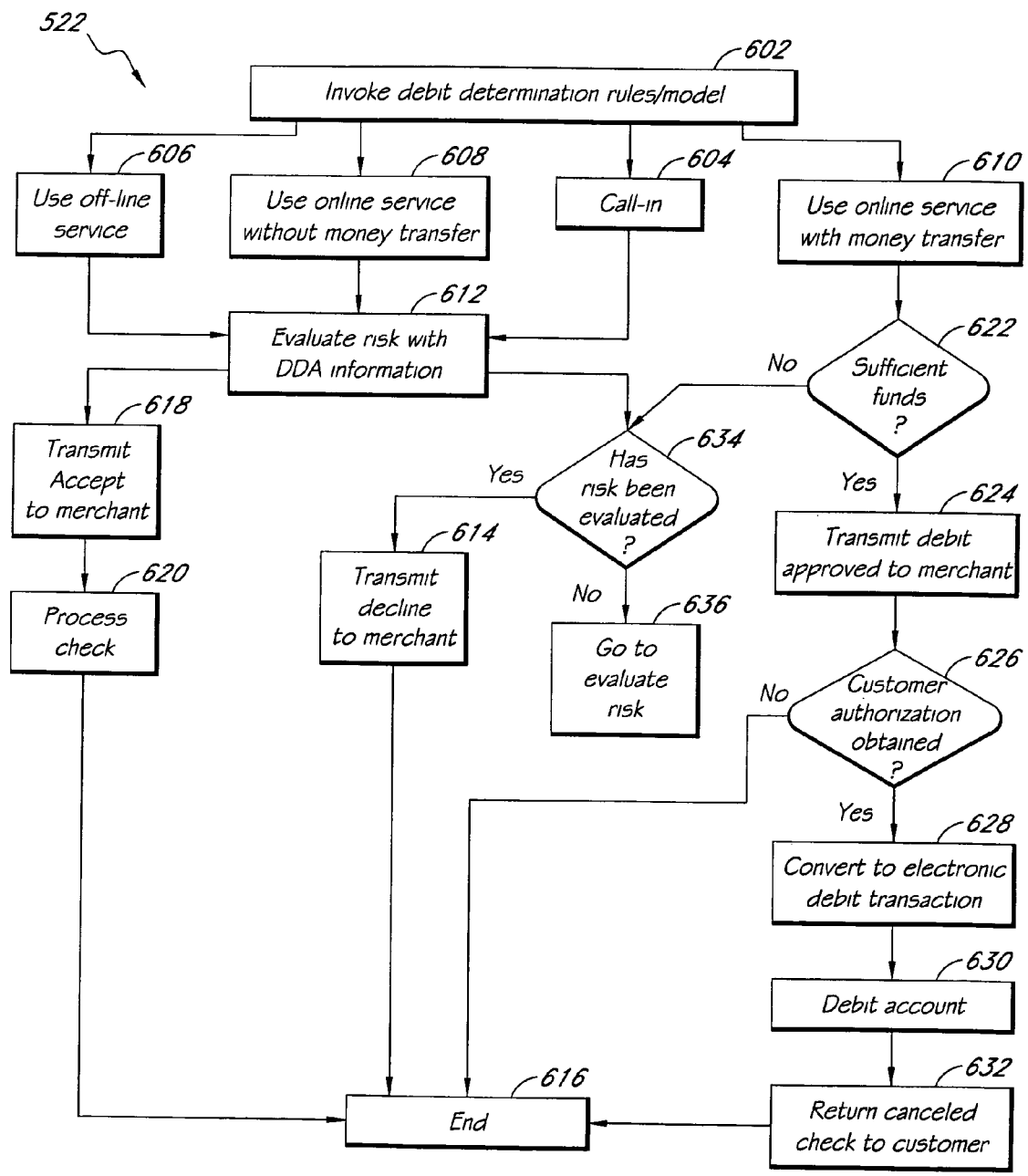
FIG. 6 illustrates a flow chart of another embodiment of a debit determination process performed by the check acceptance service.

FIG. 6 is a flow chart depicting a more detailed view of an embodiment of evaluating the debit determination 122 in the block 522 of FIG. 5. The debit determination 122 evaluates which method to use to acquire DDA information.

In an embodiment, the debit determination system 122 invokes the set of debit determination rules in a block 602. In another embodiment, the debit determination system 122 invokes the debit determination scoring model in the block 602.

Based on the outcome of the debit determination rules or the score from the debit determination scoring model, the check acceptance service 112 chooses which method to use to acquire the check writer's DDA information. In a first method, in a block 604, the check acceptance service 112 acquires the check writer's DDA information by contacting the merchant 104 and the check writer's bank 114. The check writer's bank 114 provides the check acceptance service 112 with the present status of the check writer's account 208.

In a second method, in a block 606, the check acceptance service 112 acquires the check writer's DDA information by engaging the service 138. The service 138 provides the previous day's status of the check writer's account 208 to the check acceptance service 112.

In a third method, in a block 608, the check acceptance service 112 acquires the check writer's DDA information by engaging the service 140 that does not perform fund transfers. The service 140 provides the present status of the check writer's account 208 to the check acceptance service 112, but does not initiate a funds transfer. The status may include, but is not limited to determining if the check writer's account 208 contains sufficient funds to cover the transaction.

In a block 612, the debit determination system 122 evaluates the risk of accepting the check 102 using the set of rules or the scoring model that uses DDA information. If the risk level is an acceptable level of risk for the check acceptance service 112, the check acceptance service 112 transmits the ACCEPT decision to the merchant 104 via the point of service device 118 in a block 618. The merchant 104 accepts the check 102 and the check 102 is processed in a block 620. The transaction is completed and the process ends at the block 616.

If the risk is not an acceptable amount of risk to the check acceptance service 112, the check acceptance service 112 determines if the risk using the set of rules or the scoring model that does not use DDA information (block 510) has been evaluated in a block 634.

When the risk using the set of rules or the scoring model that does not use DDA information (block 510) has been evaluated, the check acceptance service 112 transmits the DECLINE decision to the merchant 104 via the point-of-sale device 118 in a block 614. This indicates that evaluating the risk of the transaction using the set of rules or the scoring model that does not use the DDA information (block 510) and evaluating the risk using the set of rules or the scoring model that uses the DDA information (block 612) did not result in an acceptable amount of risk to the check acceptance service 112. The transaction is not completed and the process ends at a block 616.

In a block 636, the risk has not been evaluated using the set of rules or the scoring model that does not use the DDA information (block 510). The process moves to the block 510 to evaluate the risk using the set of rules or the scoring model that does not use DDA information.

However, there is still a risk that the funds will not be in the account when the check 102, if accepted, clears the bank 114. If the funds are not in the account when the check 102 clears the bank 114, the check acceptance service 112 has the additional expense of collecting on the bad debt.

The outcome of the debit determination rules or the score from the debit determination scoring model from the block 602 may indicate that knowing the status of the check writer's account 208 does not decrease the risk of accepting the check 102 to a level acceptable to the check acceptance service 112. However, in order not to decline a potentially good sale, the check acceptance service 112 performs a fourth method of acquiring the check writer's DDA information.

In a fourth method, in a block 610, the check acceptance service 112 acquires the check writer's DDA information by engaging the service 142 to initiate the direct debit of the check writer's account 208 for the amount of the transaction at the time of the transaction. The service 142 determines if sufficient funds exist in the check writer's account 208 to cover the amount of the transaction in a block 622.

When sufficient funds exist in the check writer's account 208, the check acceptance service 112 transmits the DEBIT APPROVED decision to the merchant 104 via the point-of-sale device 118 in a block 624.

In a block 626, in an embodiment, the point-of-sale device 118 prints a customer authorization for the check writer 100 to sign. The signed authorization authorizes the direct debit from the check writer's account 208 at the point of sale. The merchant 104 verifies that the check writer 100 has authorized the direct debit and transmits the verification to the check acceptance service 112 via the point-of-sale device 118.

If the check writer 100 does not sign the authorization, the transaction is not completed and the process ends at the block 616.

In a block 628, the checking transaction is converted to the direct debit in an embodiment. In another embodiment, in the block 628, the checking transaction is converted to an electronic direct debit. In a block 630, the check writer's bank 114 debits the check writer's account 208 for the amount of the check 102. In a block 632, the merchant cancels the check 102 at the point-of-sale device 118, and returns the canceled check 134 to the check writer 100. The transaction is completed and the process ends at the block 616. The check acceptance service 112 does not have the additional expense of collecting on a bad debt because the funds are debited from the check writer's account 208 at the time of the transaction.

Referring to the block 622, when sufficient funds do not exist in the check writer's account 208, the check acceptance service 112 determines if the risk of the transaction (block 510) has been evaluated in the block 634.

When the check acceptance service 112 has previously evaluated the risk for this transaction using the set of rules or the scoring model that does not use DDA information (block 510), the check acceptance service 112 transmits the DECLINE decision to the merchant 104 in the block 614. This indicates that the direct debit of the check writer's account 208 for the amount of the check 102 failed and evaluating the risk of the transaction using the set of rules or the scoring model that does not use DDA information (block 510) did not result in an acceptable level of risk to the check acceptance service 112. The transaction is not completed and the process ends in the block 616.

In the block 636, the check acceptance service 112 has not previously evaluated the risk using the set of rules or the scoring model that does not use DDA information (block 510) for this transaction. The check acceptance service 112 then evaluates the risk, as indicated in the block 510 of FIG. 5.

In certain embodiments, the service 142 debits the check writer's account 208 when engaged by the check acceptance service 112 in the blocks 410, 610 before the check writer's authorization is obtained in the blocks 424, 626. If the check writer 100 does not agree to the direct debit at the point of sale in the blocks 424, 626, the direct debit transaction is reversed. The transaction is not completed and the process ends at the blocks 416, 616.

Figure 7:
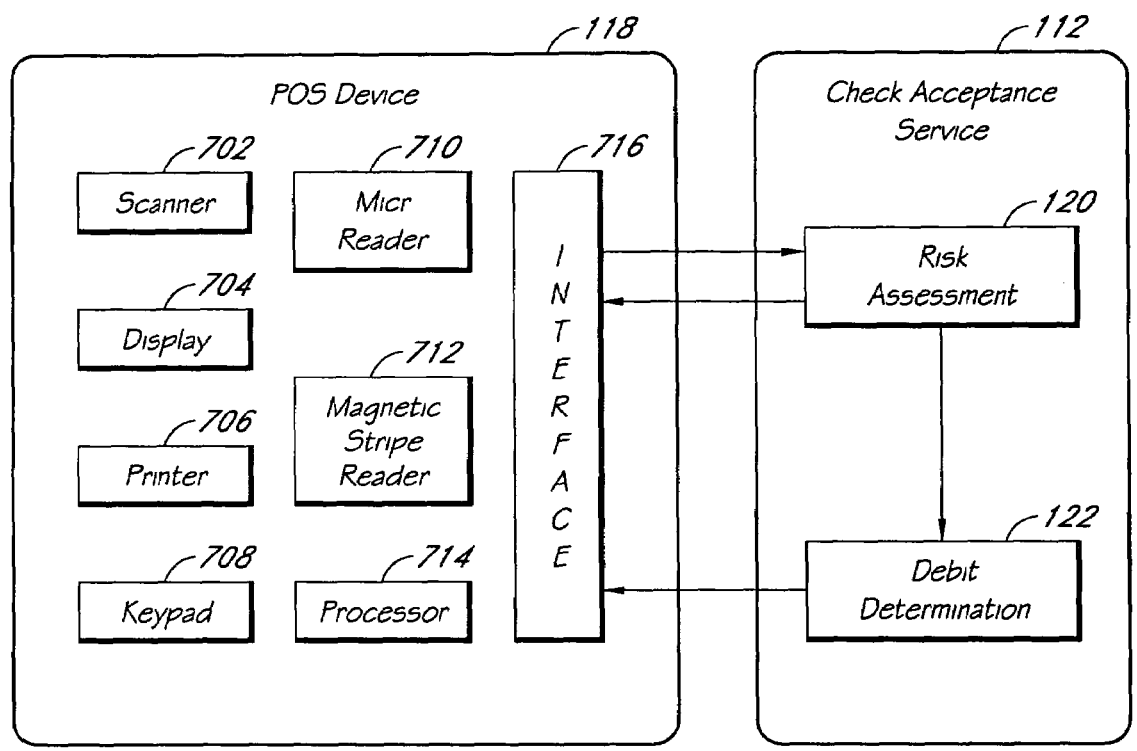
FIG. 7 is a functional a block diagram of an embodiment of a point-of-sale device.

FIG. 7 is a functional block diagram of an embodiment of the point-of-sale device 118. In an embodiment, the point-of-sale device 118 comprises a scanner 702, a display 704, a printer 706, a keypad 708, a MICR (magnetic ink character recognition) reader 710, a magnetic stripe reader 712, a processor 714, and an interface 716.

In an embodiment, the processor 714 receives data and instructions from and sends data and instructions to the check acceptance service 112 via the interface 716. In an embodiment, the processor 714 provides instructions to and receives data from the scanner 702, the display 704, the printer 706, the keypad 708, the MICR reader 710, and the magnetic stripe reader 712.

The processor 714 comprises, by way of example, computers, program logic, or other substrate configurations representing data and instructions, which operate as described herein. In other embodiments, the processor 714 can comprise controller circuitry, processor circuitry, processors, general-purpose single-chip or multi-chip microprocessors, digital signal processors, embedded microprocessors, microcontrollers and the like.

In one embodiment, the program logic may advantageously be implemented as one or more modules. The modules may advantageously be configured to execute on one or more processors. The modules may comprise, but are not limited to, any of the following: software or hardware components such as software object-oriented software components, class components and task components, processes methods, functions, attributes, procedures, subroutines, segments of program code, drivers, firmware, microcode, circuitry, data, databases, data structures, tables, arrays, or variables.

In an embodiment, the scanner 702 scans the checks 102. The MICR reader 710 reads the MICR character on the check 102. The magnetic stripe reader 712 reads the magnetic stripe information found on, for example, a driver's license or a credit card. The point-of-sale device 118 may send all or some of the scanner data, MICR data, or magnetic stripe information to the check acceptance service 112 via the interface 716.

In an embodiment, the display 704 displays the transaction status from the check acceptance service 112. In an embodiment, the transaction status may be ACCEPT, DECLINE, or DEBIT APPROVED.

In an embodiment, the printer 706 prints the customer authorization for the check writer's signature.

In an embodiment, the merchant 104 enters information via the key pad 708 to transmit to the check acceptance service 112. The information may include but is not limited to the verification that the check writer 100 authorized the direct debit transaction from the check writer's checking account 208 for the amount of the check 102.

FIG. 8 is an exemplary customer authorization form 800 for obtaining customer authorization to convert the checking transaction to the direct debit transaction.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A point of sale device for converting check transactions into direct debit transactions comprising:
    a magnetic ink character recognition (MICR) reader for reading MICR characters from a check transaction;
    a keypad for entering an amount of the check transaction;
    an interface for transmitting the MICR characters, the amount, and a check authorization transaction request associated with the check transaction to a check acceptance service;
    a display for displaying an indication of a decision received from the check acceptance service both to not authorize acceptance of the check and to convert the check transaction to a direct debit transaction; and
    a printer for printing an authorization form for obtaining a check writer's authorization authorizing a conversion of the check transaction into the direct debit transaction.

2. The device of claim 1 further comprising a scanner for scanning the check transaction.

3. The device of claim 1 further comprising a magnetic stripe reader for reading magnetic stripe data associated with the check transaction.

4. A point of sale device for converting promissory transactions into direct debit transactions comprising: an interface for transmitting data associated with a promissory transaction to a check acceptance service; and a display for displaying an indication of a decision received from the check acceptance service both to not authorize acceptance of the promissory transaction and to obtain authorization from check writer's to convert the promissory transaction to a direct debit transaction.

5. The device of claim 4 further comprising a magnetic ink character recognition (MICR) reader for reading MICR characters associated with the promissory transaction.

6. The device of claim 4 further comprising a keypad for entering the data associated with the promissory transaction.

7. The device of claim 4 further comprising a printer for printing an authorization form for obtaining a check writer's authorization to convert the promissory transaction into the direct debit transaction.

8. The device of claim 7 wherein the interface transmits verification of the check writer's authorization to the check acceptance service.

9. The device of claim 4 further comprising a scanner for scanning the promissory transaction.

10. The device of claim 4 wherein the data associated with the promissory transaction comprises MICR characters, at least one transaction detail, and a promissory transaction request.

11. The device of claim 10 wherein the transaction details comprise at least one of a demand deposit account (DDA) number, a driver's license number, a check amount, a check number, and a merchant number.

12. A point of sale device for converting promissory transactions into direct debit transactions in response to a decision to do so received from a check acceptance service, the device comprising a printer for printing an authorization form for obtaining a check writer's authorization authorizing a conversion of a promissory transaction into a direct debit transaction after the check acceptance service determines a level of risk associated with the promissory transaction is unacceptable.

13. The device of claim 12 further comprising a magnetic ink character recognition (MICR) reader for reading magnetic stripe data associated with the promissory transaction.

14. The device of claim 12 further comprising a keypad for entering data associated with the promissory transaction.

15. The device of claim 12 further comprising a scanner for scanning data associated with the promissory transaction.

16. The device of claim 12 further comprising an interface for transmitting verification of the check writer's authorization to the check acceptance service.

17. The device of claim 12 wherein the check acceptance service determines the level of risk associated with the promissory transaction using data associated with the promissory transaction comprising MICR characters, at least one transaction detail, and a promissory transaction request.

18. The device of claim 17 wherein the transaction details comprise at least one of a demand deposit account (DDA) number, a driver's license number, a check amount, a check number, and a merchant number.

19. A method of using a point of sale device to convert a promissory transaction into a direct debit transaction, the method comprising: transmitting with a point of sale device data about a promissory transaction to a check acceptance service; and displaying with the point of sale device an indication of a decision received from the check acceptance service both to not authorize acceptance of the promissory transaction and to obtain authorization from check writer's to convert the promissory transaction to a direct debit transaction.

20. The method of claim 19 further comprising reading with the point of sale device magnetic ink character recognition (MICR) characters associated with the promissory transaction.

21. The method of claim 19 further comprising entering with the point of sale device data associated with the promissory transaction.

22. The method of claim 19 wherein the data about the promissory transaction comprises MICR characters, at least one transaction detail, and a promissory transaction request.

23. The method of claim 22 wherein the transaction details comprise at least one of a demand deposit account (DDA) number, a driver's license number, a check amount, a check number, and a merchant number.

24. The method of claim 19 further comprising scanning with the point of sale device the promissory transaction.

25. The method of claim 19 further comprising printing with the point of sale device an authorization form for obtaining a check writer's authorization authorizing the conversion of the promissory transaction into the direct debit transaction.

26. The method of claim 25 further comprising transmitting with the point of sale device verification of the check writer's authorization to the check acceptance service.

27. A point of sale device for converting a promissory transaction into a direct debit transaction comprising: means for obtaining at least one transaction detail associated with a promissory transaction; means for sending the at least one transaction detail, and a promissory transaction request associated with the promissory transaction to a promissory transaction acceptance service; and means for receiving an indication of a decision from the promissory acceptance service to both not authorize acceptance of the promissory transaction and to obtain authorization from check writer's to convert the promissory transaction into a direct debit transaction.

28. The device of claim 27 further comprising a means for generating an authorization form for obtaining a check writer's authorization authorizing a conversion of the promissory transaction into the debit transaction.

29. The device of claim 28 further comprising a means for transmitting verification of the check writer's authorization to the check acceptance service.

30. The device of claim 27 further comprising a means for reading MICR characters associated with the promissory transaction.

31. The device of claim 27 further comprising a means for entering the data associated with the promissory transaction.

32. The device of claim 27 further comprising a means for scanning the promissory transaction.

33. The device of claim 27 wherein the transaction details comprise at least one of a demand deposit account (DDA) number, a driver's license number, a check amount, a check number, and a merchant number.

* * * * *